United States Patent
Crichton

(10) Patent No.: US 6,520,487 B2
(45) Date of Patent: Feb. 18, 2003

(54) MOUNTING BRACKET ASSEMBLY FOR TENSIONING OF ELECTRIFIED TAPE

(75) Inventor: John P. Crichton, Cary, NC (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/760,632

(22) Filed: Jan. 16, 2001

(65) Prior Publication Data

US 2002/0093011 A1 Jul. 18, 2002

(51) Int. Cl.[7] ............................................. E04H 17/24
(52) U.S. Cl. ............................. 256/42; 256/40; 256/49
(58) Field of Search ..................... 256/10, 40, 54, 256/42, 55, 47, 48, 49, DIG. 3, 68, 69, 65.01, 65.02, 65.03, 23, 32; 174/158 F, 158 R, 161 F, 161 R, 163 F, 163 R; 411/419; 254/213–215; 242/378.2

(56) References Cited

U.S. PATENT DOCUMENTS

| | | | | |
|---|---|---|---|---|
| 758,729 A | * | 5/1904 | Willmarth ..................... 256/40 |
| 3,416,763 A | * | 12/1968 | Moreno ........................ 254/213 |
| 3,638,912 A | * | 2/1972 | Moreno ........................ 254/161 |
| 3,848,367 A | * | 11/1974 | Barnes ........................... 52/157 |
| 3,856,265 A | * | 12/1974 | Foster .......................... 254/161 |
| 4,700,434 A | * | 10/1987 | Fambrough .................. 24/71.2 |
| 5,022,600 A | * | 6/1991 | Blanc et al. .............. 242/107.1 |
| 5,853,164 A | * | 12/1998 | Hunt ............................ 254/213 |
| 6,152,429 A | * | 10/2000 | Pettigrew ..................... 256/42 |

FOREIGN PATENT DOCUMENTS

| | | | | |
|---|---|---|---|---|
| AT | 21113 | * | 8/1905 | .................. 256/40 |
| DE | 2743750 | * | 4/1979 | .................. 256/40 |
| DE | 384942 | * | 9/1990 | .................. 256/54 |

* cited by examiner

Primary Examiner—Lynne H. Browne
Assistant Examiner—Michael P Ferguson
(74) Attorney, Agent, or Firm—Banner & Witcoff, Ltd.

(57) ABSTRACT

A retainer bracket for mounting on a fence post and for tensioning and support of a strip of fencing material includes a plate which is attached to the fence post, first and second support arms projecting outwardly from the plate and a rotatable bolt having a slot therethrough for receipt of the fencing material mounted. The support arms include a cam which cooperates with the head of the bolt to hold the bolt in position after it has been rotated to tension the fencing material.

3 Claims, 2 Drawing Sheets

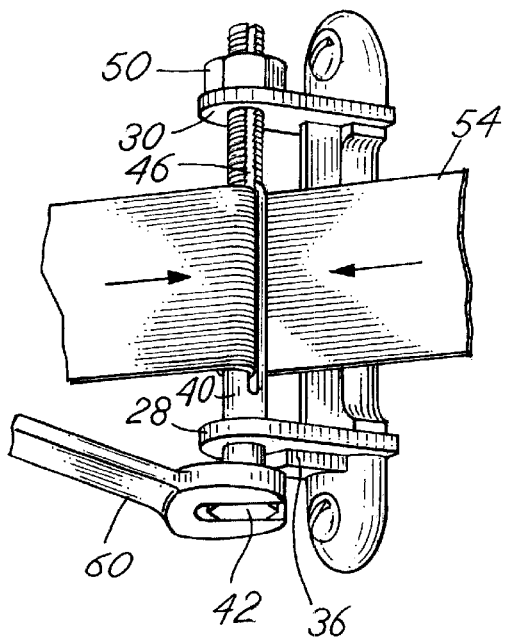
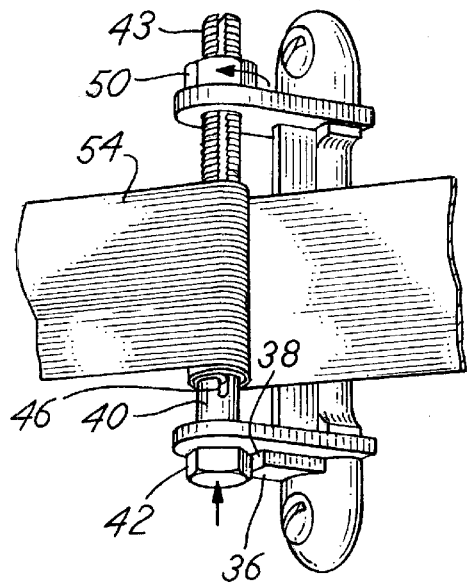
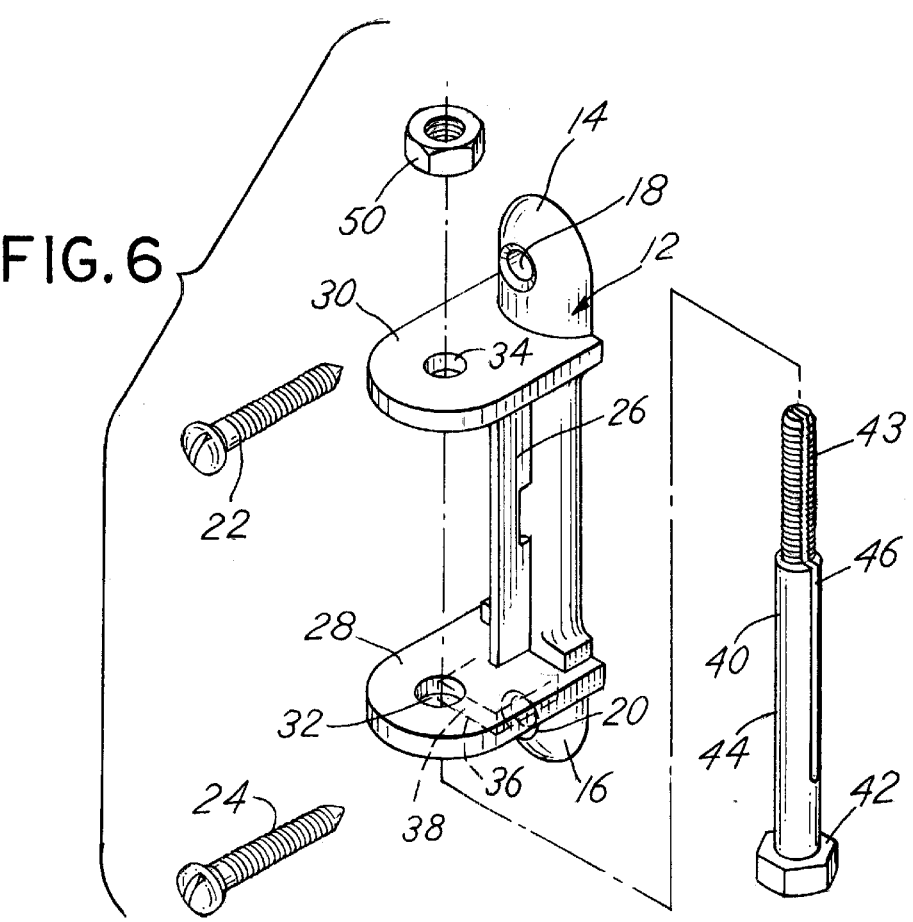

MOUNTING BRACKET ASSEMBLY FOR TENSIONING OF ELECTRIFIED TAPE

BACKGROUND OF THE INVENTION

In a principal aspect, the present invention relates to a mounting bracket assembly for attachment of electrified tape or other fencing material to a fence post and subsequent tensioning of the tape or fencing material stretched between posts.

Fencing to protect property or to enclose an area to retain animals or livestock typically includes fence posts placed in the earth at intervals with wires or fencing material attached between the fence posts. Utilization of single wires or narrow bands or wire, or electrified strips of material are all optional fencing materials. However, the use of single electrified wire strands or barbed wire as a fencing material is often not-desired inasmuch as such wire fencing material may injure animals retained within an enclosure or may cause harm to those inadvertently touching the fencing materials. Such wires are not only difficult to observe visually, but they often may cause physical harm upon being engaged. Thus, especially with animals such as horses and other livestock susceptible to injury caused by such wire or fencing, a practice has developed to incorporate the use of electrified fence tape. Such tape typically has the form of a visible ribbon which is 1–2 inches wide and is suspended or connected between fence posts. Typically, such tape is made from woven plastic strands with conductive wires woven in the plastic fabric so that the tape may be electrified. The small conductive wires woven through the tape along its length may be connected to a current source and will provide an electric shock upon contact. The shock, however, can be controlled in a way that will not harm livestock, such as horses and other animals. U.S. Pat. Nos. 4,728,080 and 4,905,969, incorporated herewith by reference, disclose conductive tape materials which are used as fencing material by connection between spaced fence posts.

Such tapes may be supported on various types of fence posts, including wooden posts, plastic posts, as well as T-cross section shaped, steel posts and various other shapes of steel and other material posts. In every instance, however, it is important to insure that the posts are not electrically connected to the tape. Thus, the post may be made from an insulating material. Alternatively, the tape or wire which is attached to the post may be attached by means of an insulating bracket.

When constructing a fence using electrified tape of the type described, or wire or other types of strands of material, it is typically necessary to string the tape or wire material between adjacent posts. Additionally, it is typically necessary to tighten the tape or other material suspended between the posts. Sagging of the fencing material is undesirable and thus fence stretchers and other tools and implements have been devised in order to provide a tight and secure suspension of the fencing material between fence posts. Maintaining appropriate tension, particularly, while the fencing material is electrified, is believed to be especially appropriate and important. Concomitantly, it is important to have a mechanism or system for such tensioning which is simple and does not require many tools to use and which is not bulky but which may be utilized in confined spaces. Thus, there has developed a need for an improved bracket or retainer for attachment of fencing material to various types of fence posts.

SUMMARY OF THE INVENTION

Briefly, the present invention comprises a mounting bracket assembly or retainer bracket for mounting on a fence post and for simultaneously providing a means to support and tension a strip of fencing material and, more particularly, a conductive strip or tape of fencing material. The described retainer bracket is especially useful with electrified tape materials of the type referenced herein. The assembly or retainer bracket includes an elongate plate member which may be attached to a fence post by fasteners or clamps. The elongate plate member includes a top end and a bottom end, a backside and a front side. First and second spaced support arms project outwardly from the front side of the plate member. The arms include aligned openings so that a bolt having a head may be fitted through the openings. A bolt includes a cam or polygonal surface which may be engaged with a lug or stop member associated with one of the spaced support arms. The bolt further includes a shaft which extends axially from the head and which includes a longitudinal slot through which a strip of fencing material may be inserted. The bolt, and more particularly the shaft, is thus fitted through an opening in one of the support arms. The fencing material is then inserted through the slot or slit in the shaft of the bolt and the bolt shaft is then fitted through the remaining opening in the adjacent support arm. The bolt may be rotated to wind or tighten the fencing material on the shaft. The head of the bolt is then engaged against the lug or cam stop member and a fastener is attached to the free end of the bolt to hold it tightly in position so that the bolt will not rotate and thereby unravel or loosen the fencing material.

Thus, it is an object of the invention to provide an improved bracket assembly or retainer bracket for attachment of, support of, and tensioning of fencing material, particularly conductive tape on a fence post and to insulate the tape from the fence post.

A further object of the invention is to provide a bracket assembly or retainer bracket which is easy to attach to multiple types of fence posts and which is constructed in a manner which provides excellent insulating characteristics to separate the fencing material from the post.

A further object of the invention is to provide a retainer bracket or bracket assembly which can be easily removed and replaced as necessary and which is inexpensive and yet rugged.

It is another object of the invention to provide a bracket assembly or retainer bracket which enables adjustment of the tension of fencing material retained and held by the bracket.

These and other objects advantages and features of the invention will be set forth in the detailed description which follows.

BRIEF DESCRIPTION OF THE DRAWING

In the detailed description which follows, reference will be made to the drawing comprised of the following figures:

FIG. 4 is an isometric view illustrating a further step in the method of use of the bracket wherein the bracket is manipulated to tighten a strip of material used in combination with the bracket;

FIG. 5 is an isometric view illustrating a further step in the use of the retainer bracket wherein the bracket is set to retain the strip in the folded, tensioned condition; and FIG. 6 is an enlarged isometric exploded view of the retainer bracket of the invention.

DESCRIPTION OF THE PREFERRED EMBODIMENT

Figure 1:
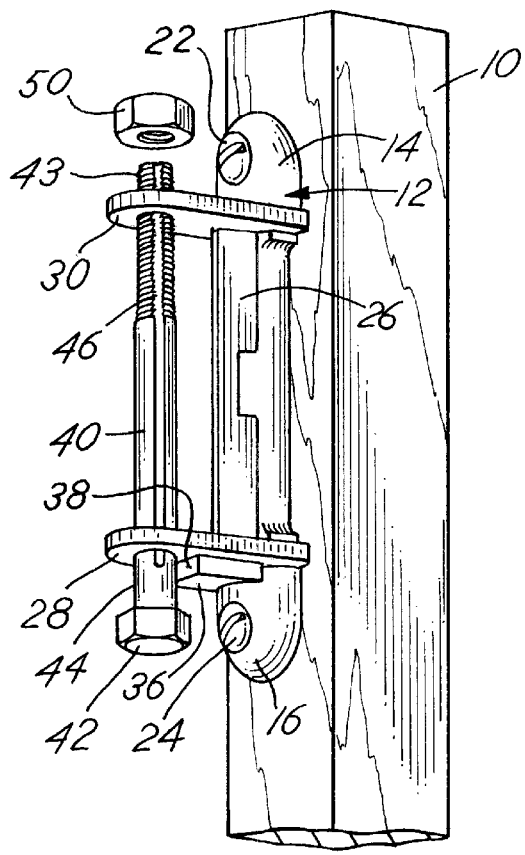
FIG. 1 is an isometric view of the retainer bracket attached to a typical fence post.

Referring to the figures, and in particular FIG. 1, the retainer bracket or bracket assembly of the invention is attached to a post 10. The retainer bracket of the invention may be utilized with wooden posts, plastic or composite posts, steel posts, and other types of material posts. The retainer bracket electrically insulates and segregates fencing material engaged by the retainer from post 10. The retainer bracket thus includes a generally planar elongate plate member 12 having a top end 14 and a bottom end 16 with openings 18 and 20 for fasteners 22 and 24 for attachment to post 10. The elongate plate member 12 is typically attached vertically to a post 10. The plate member 12 includes a central reinforcing rib 26 extending between a first outwardly projecting support arm 28 and a second outwardly extending support arm 30. The support arms 28 and 30 project outwardly from the front side of plate 12 and include openings 32 and 34, respectively which are aligned with each other and which are spaced outwardly from the plate 12. The first support arm 28 includes a lug or stop 36 with a lug or cam stop surface 38 for a purpose as defined and described below. The lug 36, importantly, is on the lower or outside surface of the first support arm 28 so that it will engage with a head of a bolt as described below.

A bolt 40 includes a hexagonal head 42 and an axially projecting shaft 44 with a longitudinal slot 46 extending through the shaft 44 along substantially the axial length of the shaft 44. A single slit or slot 46 through the shaft 44 is depicted. However, the invention is not limited to a single slit 46 through the shaft 44. For example, a pair of longitudinal slots or slits may be provided through the shaft 44 at 90° angles. Parallel slits or slots may be provided. The slots may extend longitudinally from the center of the shaft to the end thereof or may be offset with respect to the center axis of the shaft. The shaft 44 is, however, rotatable, within the openings 32 and 34. The distal or free end 43 of the shaft 44 is threaded and adapted to receive a threaded nut 50 thereon.

Figure 2:
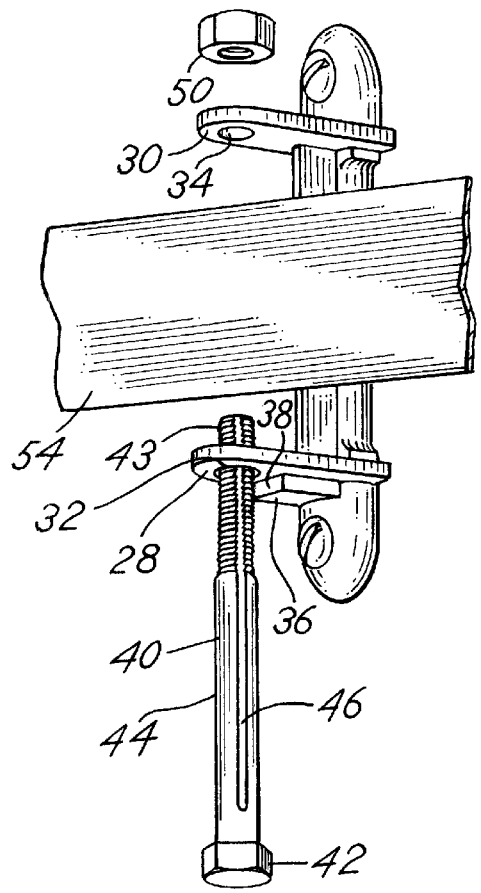
FIG. 2 is an isometric view of the bracket of FIG. 1 wherein the bracket has been disassembled to enable combination with a conductive strip.
Figure 3:
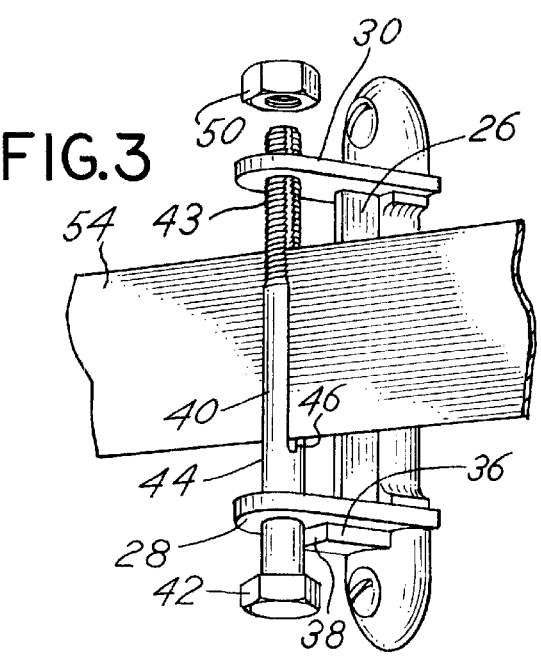
FIG. 3 is an isometric view similar to FIG. 2 wherein a conductive strip has been combined with the bracket.

As depicted in FIG. 2, the bolt 40 may be withdrawn from the passage or opening 34 so that it will extend only partially through the opening 32. It may then be moved axially to enable a tape or wire or other fencing material 54 to be fitted through slot 46 as depicted in FIG. 3. Threaded end 43 of the shaft 44 may then fit through the passage 34 and fastener 50 attached thereto.

The shaft 44 is not initially entirely fitted through the openings 32 and 34. In other words, the head 42 of the bolt is not seated against the support arm 28 until, as depicted in FIG. 4, the bolt 40 is rotated, for example, by a wrench 60 which engages the head 42 and rotates the shaft 44. Rotation of the shaft 44, as depicted in FIGS. 4 and 5 will cause the tape or fencing material 54 or whatever material is fitted through the slot 46, to, be folded or rolled upon the shaft 44. This will tension the tape 54, or whatever material is being used. After the material 54 is properly tensioned, as depicted in FIG. 5, the head 42 of the bolt 40 is seated against the bottom or outside surface of the support arm 28. When so seated, a cam flat surface of the hexagonal head 42 is seated against the cam surface 38 of lug 36. In this manner, the shaft 44 is prevented from further turning and thus the tensioned tape 54 remains and is held in tension. The nut 50 is next tightened on the shaft 44 to insure that the assembly remains appropriately seated and that the tape 54 remains properly tensioned.

It is to be noted that with this construction, adjustments and tensioning may be effected at any time after the assembly is made. It is further noted that the head 42 of the bolt 40 may have any configuration which enables it to cooperate with and be locked by a lug 36. Thus, the shapes of cam surfaces associated with the head 42 and lug 36 are designed to be compatible and lock the shaft 44 in a non-rotatable position. The particular configuration depicted in the figures is, therefore, not limiting with respect to this feature or function of the invention.

Also, the bolt 40 may be made of a conductive material whereas the plate member 12 and brackets 28 and 30 may be a molded, insulating material such as a plastic material thereby insuring that insulation is interposed between an electrified tape 54 and a post 10. Consequently, the retainer bracket of the invention provides an insulating function as well as a function which permits tensioning and support of tape, wire and other fencing material. Thus, it is possible to vary the structural features of the invention and to practice the invention by varying the manner of conduct of the steps employed in the practice of the invention without departing from the full spirit and scope of the invention. The invention is, therefore, to be limited only by the following claims and equivalents thereof.

What is claimed is:

1. A retainer bracket for mounting on a fence post and for tensioning and support of a strip of fencing comprising, in combination:

an elongate plate member having a top end, a bottom end, a back side and a front side, said top end including a fastener opening and said bottom end including a fastener opening;

a first, upper, support arm and a second, lower, spaced support arm spaced from the first arm, said first and second arms respectively projecting outwardly from the front side of the plate member adjacent to the top end and the bottom end, said arms including aligned openings, at least one of said arms including a cam retention lug, said arms located intermediate the elongate plate fastener openings;

a separate, removable bolt having a head with an edge surface having at least one cam face on the edge surface of the head, and a shaft with an axis and elongate axial slot for receipt of a strip therethrough, said shaft projecting axially from the head, said bolt shaft extending through both of the aligned openings in the support arms for axial movement and rotatable about the axis therein; and a fastener for the bolt to retain the bolt in the openings with the cam face abutting the cam retention lug and precluded from rotation about the shaft axis upon axial movement of the bolt, said bolt having the dual function of supporting the strip on the plate member and for tightening of the strip member by rotation of the bolt prior to engagement of the cam face with the lug by axial movement of the bolt.

2. The bracket of claim 1 wherein the bolt head is polygonal and the cam retention lug includes a flat face for engagement with a side of the polygonal head.

3. The bracket of claim 1 wherein the fastener is a nut.

* * * * *